(12) United States Patent
Williams et al.

(10) Patent No.: US 9,927,000 B2
(45) Date of Patent: Mar. 27, 2018

(54) DECOUPLER WITH CONTROLLED DAMPING

(71) Applicant: Litens Automotive Partnership, Woodbridge (CA)

(72) Inventors: Warren J. Williams, Oakville (CA); Ron Lapos, Brampton (CA); Gerald J. Hamers, Woodbridge (CA)

(73) Assignee: Litens Automotive Partnership, Woodbridge, ON (CA)

( * ) Notice: Subject to any disclaimer, the term of this patent is extended or adjusted under 35 U.S.C. 154(b) by 204 days.

(21) Appl. No.: 15/021,220

(22) PCT Filed: Oct. 1, 2014

(86) PCT No.: PCT/CA2014/000725
§ 371 (c)(1),
(2) Date: Mar. 10, 2016

(87) PCT Pub. No.: WO2015/048885
PCT Pub. Date: Apr. 9, 2015

(65) Prior Publication Data
US 2016/0223050 A1    Aug. 4, 2016

Related U.S. Application Data

(60) Provisional application No. 61/885,373, filed on Oct. 1, 2013, provisional application No. 61/891,405, filed on Oct. 16, 2013.

(51) Int. Cl.
*F16F 15/12* (2006.01)
*F16D 41/20* (2006.01)
(Continued)

(52) U.S. Cl.
CPC ............ *F16F 15/12* (2013.01); *F16D 3/12* (2013.01); *F16D 3/14* (2013.01); *F16D 41/206* (2013.01);
(Continued)

(58) Field of Classification Search
CPC ......... F16F 15/12; F15F 15/1203; F16D 3/12; F16D 3/14; F16D 41/206; F16D 3/10; F16H 55/36; F16H 2055/366; F02B 67/06
(Continued)

(56) References Cited

U.S. PATENT DOCUMENTS 3,249,187 A    5/1966   McDowall
5,156,573 A    10/1992  Bytzek et al.
(Continued)

FOREIGN PATENT DOCUMENTS

CA    2547383 A1    6/2005
CA    2713897 A1    8/2009
(Continued)

OTHER PUBLICATIONS

Agricultural Equipment Clutch—Dimensions (P-996), Warner Electric.
(Continued)

*Primary Examiner* — William E Dondero
*Assistant Examiner* — Robert T Reese
(74) *Attorney, Agent, or Firm* — Millman IP, Inc.

(57) ABSTRACT

In an aspect, a decoupler is provided, comprising a hub defining an axis, a pulley, a one way clutch and an isolation spring that act in series, a damping member that frictionally engages a friction surface the pulley or the hub, and a biasing member that urges the damping member into the friction surface. The biasing member has a mounting portion having an axially extending first mounting surface that is fixedly engaged with a second axially extending mounting surface
(Continued)

on the other of the pulley and hub and an engagement portion resiliently connected to the mounting portion by a transition portion having at least one bend that urges the engagement portion into engagement with the damping member with a selected force. The at least one bend resiliently permits axial movement of the damping member engagement portion independent of the mounting portion.

14 Claims, 4 Drawing Sheets

(51) Int. Cl.
  *F16H 55/36* (2006.01)
  *F16D 3/12* (2006.01)
  *F16D 3/14* (2006.01)

(52) U.S. Cl.
  CPC ......... *F16F 15/1203* (2013.01); *F16H 55/36* (2013.01); *F16H 2055/366* (2013.01)

(58) Field of Classification Search
  USPC .......................................................... 474/94
  See application file for complete search history.

(56) References Cited

U.S. PATENT DOCUMENTS

| | | | |
|---|---|---|---|
| 7,153,227 B2 | 12/2006 | Dell et al. | |
| 7,591,357 B2 | 9/2009 | Antchak et al. | |
| 7,624,852 B2 | 12/2009 | Mevissen et al. | |
| 7,708,661 B2 | 5/2010 | Pflug et al. | |
| 7,712,592 B2 | 5/2010 | Jansen et al. | |
| 7,766,774 B2 | 8/2010 | Antchak et al. | |
| 7,972,231 B2 | 7/2011 | Kawamoto et al. | |
| 8,192,312 B2 | 6/2012 | Ali et al. | |
| 8,313,400 B2 | 11/2012 | Serkh et al. | |
| 8,591,358 B2 | 11/2013 | Fischer | |
| 9,068,608 B2 | 6/2015 | Serkh et al. | |
| 2003/0224886 A1 | 12/2003 | King et al. | |
| 2004/0014540 A1 | 1/2004 | Dell et al. | |
| 2005/0059518 A1 | 3/2005 | Joslyn | |
| 2007/0240964 A1 | 10/2007 | Saito et al. | |
| 2007/0254756 A1 | 11/2007 | Kawamoto et al. | |
| 2008/0058140 A1 | 3/2008 | Gerring | |
| 2008/0058142 A1 | 3/2008 | Joslyn | |
| 2008/0108442 A1 | 5/2008 | Jansen et al. | |
| 2008/0139351 A1 | 6/2008 | Pflug et al. | |
| 2008/0194339 A1 | 8/2008 | Antchak et al. | |
| 2008/0280709 A1 | 11/2008 | Gouadec | |
| 2008/0280713 A1 | 11/2008 | Fischer | |
| 2008/0312014 A1 | 12/2008 | Hermann et al. | |
| 2009/0194380 A1 | 8/2009 | Ali et al. | |
| 2010/0144473 A1 | 6/2010 | Ward et al. | |
| 2013/0098727 A1* | 4/2013 | Williams | F02B 67/06 192/56.2 |
| 2013/0150191 A1 | 6/2013 | Ishida | |
| 2013/0217524 A1* | 8/2013 | Antchak | F02B 67/06 474/94 |
| 2013/0237351 A1 | 9/2013 | Marion | |
| 2016/0201757 A1* | 7/2016 | Tran | F16D 3/10 474/94 |

FOREIGN PATENT DOCUMENTS

| | | |
|---|---|---|
| CA | 2740322 A1 | 5/2010 |
| CN | 1890479 A | 1/2007 |
| CN | 101111692 A | 1/2008 |
| DE | 19501685 C1 | 7/1996 |
| DE | 19524403 C2 | 9/2000 |
| DE | 102005008580 A1 | 9/2005 |
| DE | 20205016992 U1 | 2/2006 |
| EP | 2235400 A4 | 8/2009 |
| WO | 2006045181 A1 | 5/2006 |
| WO | 2007074016 A1 | 7/2007 |
| WO | 2007118441 A2 | 10/2007 |
| WO | 2008022897 A1 | 2/2008 |
| WO | 2008067915 A1 | 6/2008 |
| WO | 2008071306 A1 | 6/2008 |
| WO | 2009099504 A3 | 8/2009 |
| WO | 2010048732 A1 | 5/2010 |
| WO | 2011160202 A1 | 12/2011 |
| WO | 2012061936 A1 | 5/2012 |
| WO | 2013155615 A1 | 10/2013 |
| WO | 2015048885 A1 | 4/2015 |

OTHER PUBLICATIONS

Caltherm Thermal Actuators (web page), 40477, Caltherm Corporation (http://caltherm.com/Thermal%20Actuators.html).
Compact Button Cell Actuator (Sample)(web page), 40519, Therm Omega Tech (http://www.thermomegatech.com/products.php?product=Compact-Button-Cell-Actuator).
Elements Thermostatiques, 2006, Vernet S.A.
Office Action for CN201180054808 (SIPO), 42037.
P/Q Solenoid Families (brochure), Trombetta Motion Technologies.
PCT/CA2011/001263, Search Report, 40963.
Search Report for CN201180054808 (SIPO), 42027.
Thermal Actuators: Solid-Liquid Phase Change Actuators (brochure), Unknown, Therm-Omega-Tech, Inc.
Thermally Activated Linear Actuators, 40395, Rostra Vernatherm LLC (http://www.rostravematherm.com/thermal-actuators.htm).
Trombetta P613-K Series Throttle Control Kit, Trombetta Electromagentics.
Warner Electric PC-500 (specification sheet), 39464, Warner Electric.
Warner Electric PC-500 Clutch, Warner Electric.
Wax Actuators: Is the Wax Actuator Due for a Revival?, 1999, Spartan Peripheral Devices.

* cited by examiner

DECOUPLER WITH CONTROLLED DAMPING

CROSS-REFERENCE TO RELATED APPLICATIONS

This application claims the benefit of U.S. Provisional Application No. 61/885,373, filed Oct. 1, 2013, and U.S. Provisional Application No. 61/891,405, filed Oct. 16, 2013, the contents of both of which are incorporated herein by reference in their entirety.

FIELD OF INVENTION

This disclosure relates generally to the field of decouplers, which allow items that are operatively connected to an endless drive member (such as an engine crankshaft and input shafts for belt-drive accessories on a vehicle engine) to operate temporarily at a speed other than the speed of the endless drive member, and more particularly decouplers for alternators.

BACKGROUND OF INVENTION

It is known to provide a decoupler mechanism on an accessory, such as an alternator, that is driven by a belt from the crankshaft of an engine in a vehicle. Such a decoupling mechanism, which may be referred to as a decoupler assembly or a decoupler, permits the associated accessory to operate temporarily at a speed that is different than the speed of the belt. As is known, the crankshaft undergoes cycles of accelerations and decelerations associated with the firing of the cylinders in the engine. The decoupler permits the alternator shaft to rotate at a relatively constant speed even though the crankshaft from the engine, and hence, the pulley of the decoupler, will be subjected to these same cycles of decelerations and accelerations, commonly referred to as rotary torsional vibrations, or torsionals.

It has been found also that the alternator itself can contribute to torsional vibrations due to clipping of the field voltage that can take place during operation of the alternator. When such torsionals occur at certain frequencies, they can result in resonance in the spring of the decoupler, leading to large angular swings of the decoupler pulley relative to the hub, which ultimately leads to failure of the decoupler spring from fatigue.

In situations where torsionals are problematic, it has been found that damping of the movement of the decoupler pulley and hub relative to one another can extend the life of the spring. However, it has also been found difficult to manufacture the decoupler in such a way that it remains compact, while ensuring that the tolerance stack up associated with its manufacture does not result in large variability in the amount of damping that is provided. If too little damping is provided, the resonance in the spring may not be sufficiently diminished to keep the spring from failing prematurely. If too much damping is provided, then the driven accessories on the engine may not be sufficiently isolated from the torsionals that occur at the crankshaft.

It would be beneficial to provide a decoupler that addresses these issues.

SUMMARY

In an aspect, a decoupler is provided, including a hub defining an axis, a pulley that is rotatably mounted to the hub, a one way clutch and an isolation spring that act in series in a torque path between the pulley and the hub, a damping member that is positioned to frictionally engage a friction surface on one of the pulley and the hub, and a damping member biasing member positioned to urge the damping member into engagement with the friction surface. The damping member biasing member has a mounting portion having an axially extending first mounting surface that is fixedly engaged with a second axially extending mounting surface on the other of the pulley and the hub and a damping member engagement portion that is resiliently connected to the mounting portion by a transition portion having at least one bend. The at least one bend urges the damping member engagement portion into engagement with the damping member with a selected force. The at least one bend resiliently permits axial movement of the damping member engagement portion independent of the mounting portion.

In another aspect, a decoupler is provided, including a hub defining an axis, a pulley that is rotatably mounted to the hub, a one-way clutch and an isolation spring that act in series in a torque path between the pulley and the hub, a damping member that is positioned to frictionally engage a friction surface on one of the pulley and the hub, and a damping member biasing member positioned to urge the damping member into engagement with the friction surface. The damping member biasing member has a radially outer portion fixedly engaged with a radially inner surface on the other of the pulley and the hub. The damping member biasing member further includes a radially inner portion that is resiliently connected to the radially outer portion by a transition portion having a first bend and a second bend which are configured such that the transition portion is generally S-shaped in profile. The first and second bends cooperate to urge the radially inner portion into engagement with the damping member with a selected force. The first and second bends cooperate to resiliently permit axial movement of the damping member engagement portion independent of the mounting portion.

In another aspect a method of assembling a decoupler is provided, including:

a) providing a hub defining an axis, a pulley rotatably mounted to the hub, and a one-way clutch and an isolation spring that act in series in a torque path between the pulley and the hub;

b) providing a damping member configured to engage a friction surface on one of the pulley and the hub;

c) providing a damping member biasing member having a mounting portion and a damping member engagement portion that is resiliently connected to the mounting portion by a transition portion having at least one bend;

d) mounting the damping member biasing member on the other of the pulley and the hub such that the mounting portion of the damping member biasing member is engaged with an axially extending surface of said other of the pulley and the hub, and such that the damping member engagement portion urges the damping member into engagement with the friction surface on said one of the pulley and the hub;

e) measuring, at least one time, a value related to a force between the damping member and the friction surface and adjusting the axial position of the damping member biasing member based on the value; and f) fixing the position of the damping member biasing member on the axially extending surface of said one of the pulley and the hub after step e).

BRIEF DESCRIPTION OF THE DRAWINGS

The foregoing and other aspects of the disclosure will be more readily appreciated by reference to the accompanying drawings, wherein.

DETAILED DESCRIPTION OF EMBODIMENTS

Figure 1:
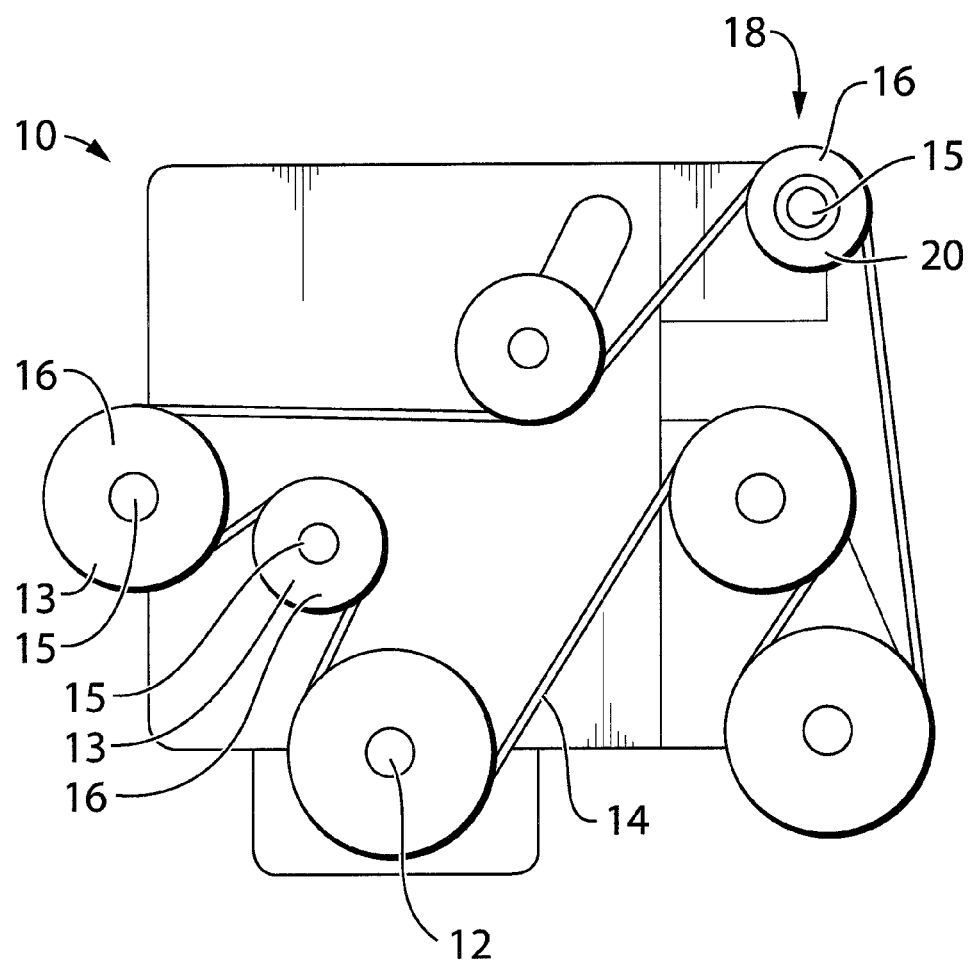
FIG. 1 is an elevation view of an engine with a belt drive with a decoupler in accordance with an embodiment of the present invention.

Reference is made to FIG. 1, which shows an engine 10 for a vehicle. The engine 10 includes a crankshaft 12 which drives an endless drive element, which may be, for example, a belt 14. Via the belt 14, the engine 10 drives a plurality of accessories 16 (shown in dashed outlines), such as an alternator 18. Each accessory 16 includes an input drive shaft 15 with a pulley 13 thereon, which is driven by the belt 14. A decoupler 20 is provided instead of a pulley, between the belt 14 and the input shaft 15 of any one or more of the belt driven accessories 16, and in particular the alternator 18.

Figure 2:
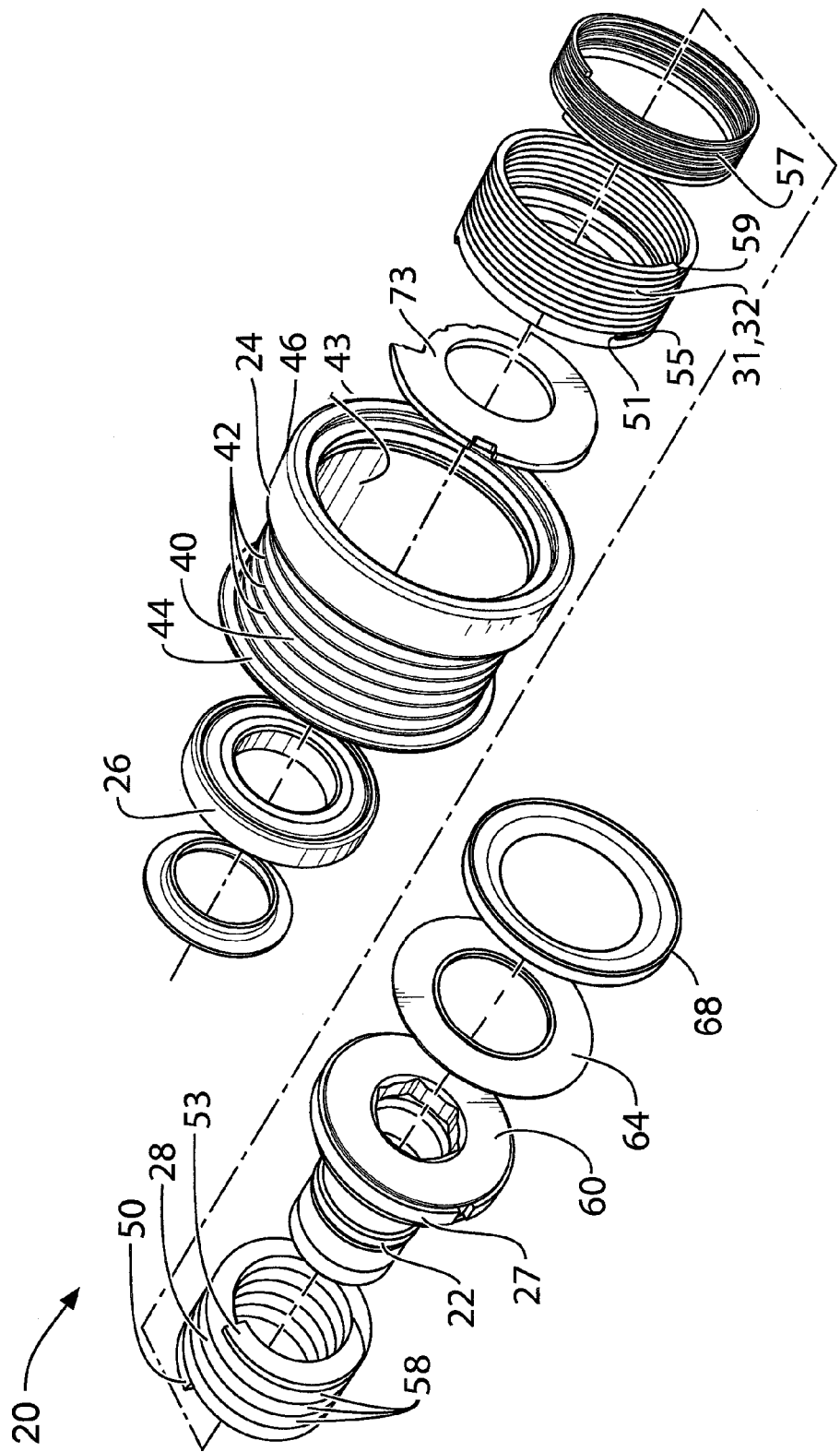
FIG. 2 is an exploded perspective view of the decoupler shown in FIG. 1.
Figure 3:
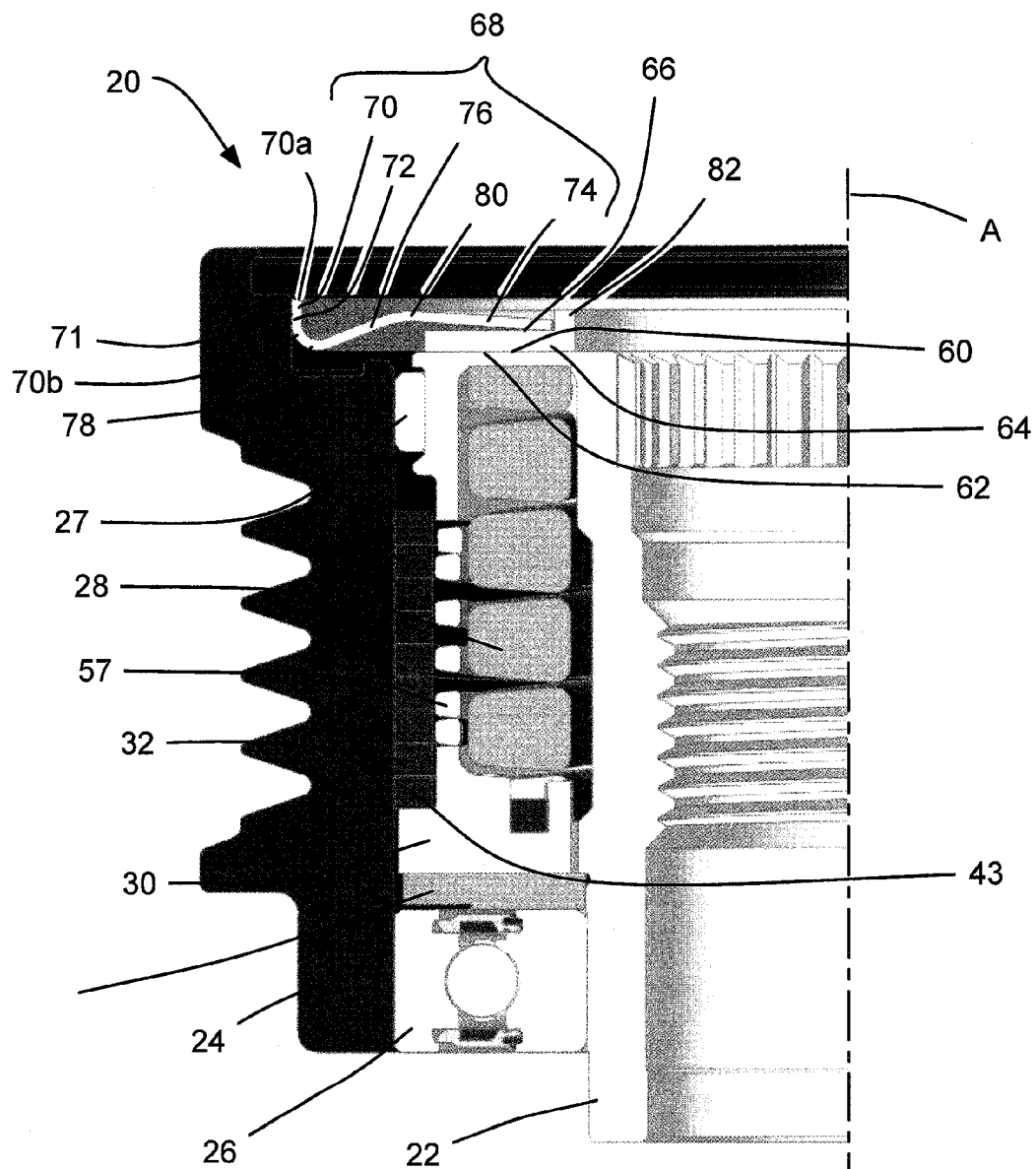
FIG. 3 is a sectional elevation of the decoupler shown in FIG. 1.

Reference is made to FIGS. 2 and 3, which show an exploded perspective view and a sectional view respectively of the decoupler 20. The decoupler 20 includes a hub 22, a pulley 24, a first bearing member 26, a second bearing member 27, an isolation spring 28, a carrier 30, and a one-way clutch 32, which in this example embodiment is a wrap spring clutch.

The hub 22 may be adapted to mount to the accessory shaft 15 (FIG. 1) in any suitable way. For example, the hub 22 may have a shaft-mounting aperture 36 therethrough that is used for the mounting of the hub 22 to the end of the shaft 15, for co-rotation of the hub 22 and the shaft 15 about an axis A (FIG. 3).

The pulley 24 is rotatably mounted to the hub 22. The pulley 24 has an outer surface 40 which is configured to engage the belt 14. The outer surface 40 is shown as having grooves 42. The belt 14 may thus be a multiple-V belt. It will be understood however, that the outer surface 40 of the pulley 24 may have any other suitable configuration and the belt 14 need not be a multiple-V belt. For example, the pulley 24 could have a single groove and the belt 14 could be a single V belt, or the pulley 24 may have a generally flat portion for engaging a flat belt 14. The pulley 24 further includes an inner surface 43, which the wrap spring clutch 32 may engage in order to couple the pulley and hub 22 together. The pulley 24 may be made from any suitable material, such as a steel, or aluminum, or in some cases a polymeric material, such as certain types of nylon, phenolic or other materials.

The first bearing member 26 rotatably supports the pulley 24 on the hub 22 at a first (proximal) axial end 44 of the pulley 24. The first bearing member 26 may be any suitable type of bearing member, such as a bushing made from nylon-4-6 or for some applications it could be PX9A which is made by DSM in Birmingham, Mich., USA, or some other suitable polymeric material, and may be molded directly on the pulley 24 in a two step molding process in embodiments wherein a molded pulley is provided. It may be possible to use a bearing (e.g. a ball bearing) as the first bearing member 26 instead of a bushing. In such a case, the bearing could be inserted into a mold cavity and the pulley 24 could be molded over the bearing 26. Instead of a bearing, a metallic (e.g. bronze) bushing may be provided, which can be inserted into a mold cavity for the pulley molding process in similar fashion to the aforementioned bearing.

The second bearing member 27 is positioned at a second (distal) axial end 46 of the pulley 24 so as to rotatably support the pulley 24 on a pulley support surface 48 of the hub 22. The second bearing member 27 may mount to the pulley 24 and to the hub 22 in any suitable ways. In the embodiment shown, the second bearing member 27 may be molded around the pulley support surface 48 by an injection molding process wherein the hub 22 forms part of the mold. The hub 22 may have a coating thereon prior to insertion into the mold cavity, to prevent strong adherence of the bearing member 27 to the pulley support surface 48 during the molding process, so that after removal of the hub 22 and bearing member 27 from the molding machine (not shown), the bearing member 27 can rotate about the hub 22. It will be noted that other ways of joining the second bearing member 27 and the pulley 24 may be employed, such as adhesive bonding, and/or using mechanical joining elements (e.g. resilient locking tabs) that would lock the bearing member 27 to the pulley.

The isolation spring 28 is provided to accommodate oscillations in the speed of the belt 14 relative to the shaft 15. The isolation spring 28 may be a helical torsion spring that has a first helical end 50 that is held in an annular slot and that abuts a radially extending driver wall 52 (FIG. 3) on the carrier 30. The isolation spring 28 has a second helical end 53 (FIG. 2) that engages a similar driver wall (not shown) on the hub 22. In the embodiment shown, the isolation spring 28 has a plurality of coils 58 between the first and second ends 50 and 53. The coils 58 are preferably spaced apart by a selected amount and the isolation spring 28 is preferably under a selected amount of axial compression to ensure that the first and second helical ends 50 and 53 of the spring 28 are abutted with the respective walls on the carrier 30 and hub 22. An example of a suitable engagement between the isolation spring 28, the hub 22 and the carrier 30 is shown and described in U.S. Pat. No. 7,712,592, the contents of which are incorporated herein by reference. A thrust plate 73 may be provided to receive the axial thrust force of the carrier 30 resulting from the axial compression of the spring 28.

The isolation spring 28 may be made from any suitable material, such as a suitable spring steel. The isolation spring 28 may have any suitable cross-sectional shape. In the figures, the isolation spring 28 is shown as having a generally rectangular cross-sectional shape, which provides it with a relatively high torsional resistance (i.e. spring rate) for a given occupied volume. However, a suitable spring rate may be obtained with other cross-sectional shapes, such as a circular cross-sectional shape or a square cross-sectional shape.

Alternatively, the isolation spring 28 may be compression spring. As a further alternative, the isolation spring 28 may be one of two or more isolation springs, each of which is a compression spring. Such a configuration is shown in U.S. Pat. No. 7,708,661 and US Patent application publication no. US2008/0312014, PCT publication no. WO2007/074016, PCT publication no. WO2008/022897, PCT publication no. WO2008/067915, and PCT publication no. WO2008/071306, the disclosures of all of which are hereby incorporated by reference in their entirety.

In the embodiment shown in FIG. 2, a sleeve 57 is provided between the isolation spring 28 and the wrap spring clutch 32. The sleeve 57 is, in the embodiment shown, a helical member itself, although it could have any other suitable configuration such as a hollow cylindrical shape. The sleeve 57 acts as a torque limiter by limiting the amount of room available for radial expansion of the isolation spring 28 (in embodiments wherein the isolation spring 28 is a torsion spring). Thus when a torque is provided by the pulley 24 that exceeds a selected limit, the isolation spring 28 expands until it is constrained by the sleeve 57. An example of a suitable sleeve 57 is shown and described in U.S. Pat. No. 7,766,774, the contents of which are hereby incorporated by reference.

The helical wrap spring clutch 32 has a first end 51 that is engageable with a radial wall 55 of the carrier 30 and that may be fixedly connected to the carrier 30. The helical wrap spring clutch 32 has a second end 59 that may be free floating. The carrier 30 may be made from any suitable material such as, for example, a suitable nylon or the like.

When a torque is applied from the belt 14 to the pulley 24 to drive the pulley 24 at a speed that is faster than that of the shaft 15, friction between the inner surface 43 of the pulley 24 and the coils of the wrap spring clutch 32 drives at least one of the coils of the wrap spring clutch 32 at least some angle in a first rotational direction about the axis A, relative to the first end 51 of the wrap spring clutch 32. The relative movement between the one or more coils driven by the pulley 24 relative to the first end 51 causes the clutch spring to expand radially, which further strengthens the grip between the coils of the wrap spring clutch 32 and the inner surface 43 of the pulley 24. As a result, the first end 59 of the wrap spring clutch 32 transmits the torque from the pulley to the carrier 30. The carrier 30 transmits the torque to the hub 22 through the isolation spring 28. As a result, the hub 22 is brought up to the speed of the pulley 24. Thus, when the pulley 24 rotates faster than the hub 22, the wrap spring clutch 32 operatively connects the pulley 24 to the carrier 30 and therefore to the hub 22.

As best seen in FIG. 3, a first friction surface 60 at the distal end of the hub 22 is engaged by a second friction surface 62 on a damping member 64. The first and second friction surfaces 60 and 62 on the hub 22 and damping member 64 may both extend in a generally radial-circumferential plane and more specifically, may be generally annular. The damping member 64 also has a generally annular receiving surface 66 on a side that is opposite the friction surface 62. A damping member biasing member 68 is positioned to engage the receiving surface 66 and urge the damping member 64 into engagement with the friction surface 60.

The damping member biasing member 68 has a mounting portion 70 that has a first axially extending mounting surface 71 that is fixedly engaged with a radially inner surface 72 on the pulley 24 that constitutes a second axially extending mounting surface. The mounting portion 70 may comprise a generally cylindrical wall (a radially outer wall), which may be fixedly engaged with the surface 72 by press-fit, by staking, by welding or by any other suitable means. The damping member biasing member 68 further includes a damping member engagement portion 74 that is resiliently connected to the mounting portion 70 by a transition portion 76. The transition portion 76 has at least one bend in it. In the example shown in FIG. 3, the transition portion 76 has a first bend 78 and a second bend 80. The bends 78 and 80 may be configured such that the transition portion 76 is generally S-shaped in profile (i.e. in the cross-sectional view shown in FIG. 3) as is the case in the example embodiment shown. The bends 78 and 80 urge the damping member engagement portion 74 into engagement with the damping member 64 with a selected force. The bends 78 and 80 resiliently permits axial movement of the damping member engagement portion 74 independent of the mounting portion 70.

As a result of the engagement between axially extending mounting surfaces 71 and 72 axial adjustment of the position of the biasing member 68 during assembly of the decoupler 20 prior to fixing of the biasing member 68 in position on the mounting surface 72, so as to permit an assembly worker (or an assembly machine) to ensure that the selected force is applied to the damping member 68 before the biasing member is fixed in place on the mounting surface 72.

The selected force applied to the damping member 64 results in a damping force, that, in turn, results in a damping torque that helps to prevent resonance in the isolation spring 28. The damping torque may be any suitable value, such as a torque within a range of about 0.5 Nm to about 5 Nm. The spring rate of the biasing member 68 may be selected to be low to reduce sensitivity to the amount of flexure.

In an embodiment, the damping member engagement portion 74 may be engaged with the damping member 64 sufficiently to prevent relative rotation therebetween during operation of the decoupler 20. As a result, the amount of damping that is provided by the damping member 64 may be consistent, whereas in some prior art decouplers, some relative movement can occur between a biasing member and the damping member, which can lead to unpredictable slippage in certain situations, which in turn leads to less control over the damping that occurs.

In an embodiment, the damping member engagement portion 74 lies substantially flat against the receiving surface 66 of the damping member 64 when applying the selected force on the damping member 64. This can increase the amount of surface contact therefore the amount of grip present between the biasing member 68 and the damping member 64 so as to prevent relative rotation therebetween.

While it has been shown for the friction surface 62 to be on the hub 22 and for the damping member biasing member to fixedly connect to the pulley 24, it will be noted that the decoupler 20 could be configured to provide the friction surface 62 on the pulley 24 for engagement by the damping member 64 and for the damping member biasing member 68 to fixedly engage the hub 22. Thus, it can be said that the decoupler 20 includes a damping member that is positioned to frictionally engage a friction surface on one of the pulley and the hub, and a damping member biasing member positioned to urge the damping member into engagement with the friction surface, wherein the damping member biasing member has a mounting portion, a damping member engagement portion and a transition portion having at least one bend in it.

Additionally, while the axially extending mounting surface 72 is a radially inner surface of the pulley 24, it is alternatively possible for the surface 72 to be a radially outer surface of the pulley 24, or for it to be a radially inner or outer surface of the hub 22 (in embodiments wherein the biasing member 68 is mounted to the hub 22).

The damping member 64 includes an axially extending lip 82 that generally cooperates with the damping member engagement portion 74 to keep the damping member 64 generally centered about the axis A.

Figure 4:
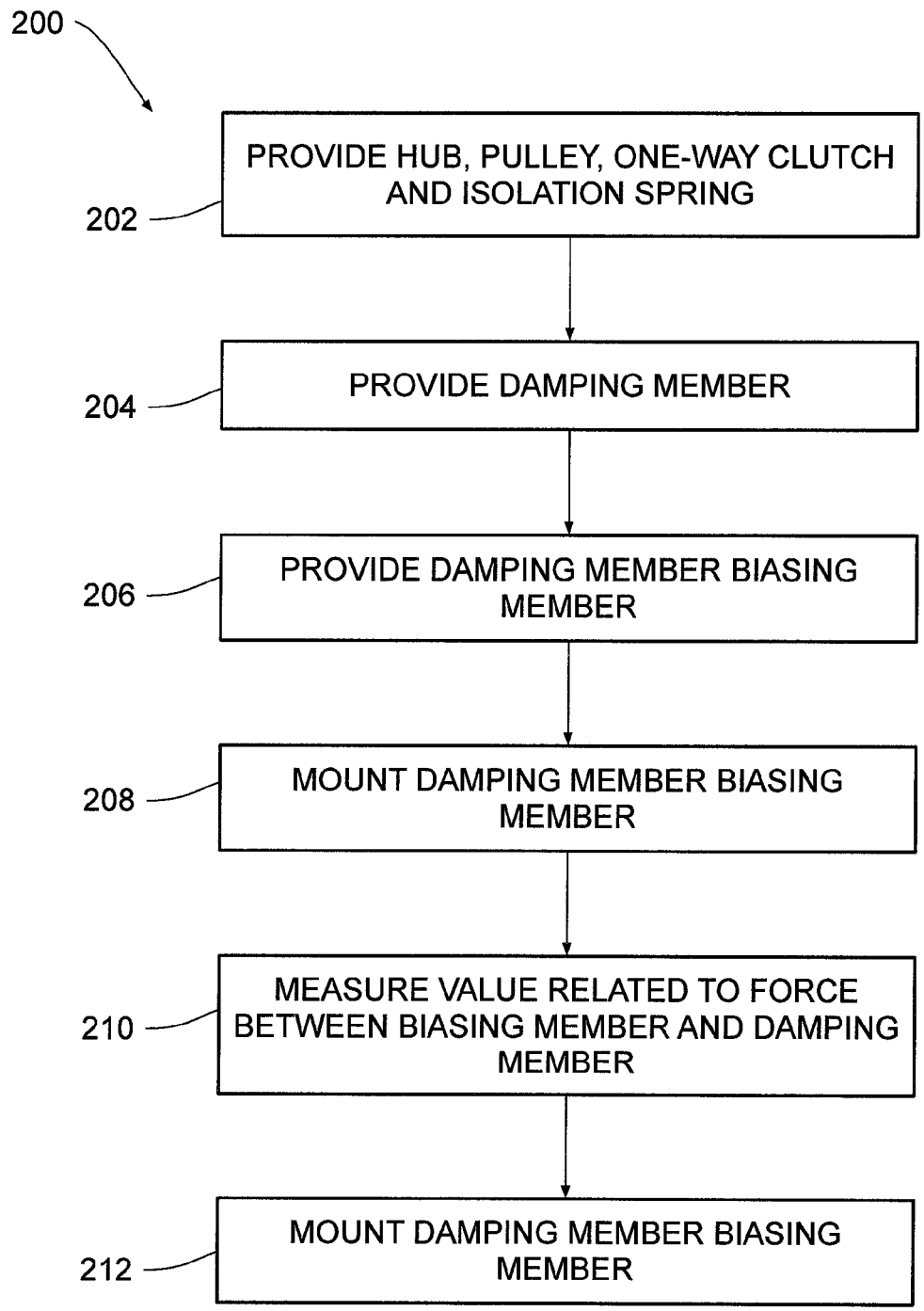
FIG. 4 is a flow chart illustrating a method of assembling the decoupler shown in FIG. 1.

To carry out the assembly process of the decoupler 20, a method as shown in FIG. 4 may be used. The method is shown at 200. The method includes a step 202 which is providing a hub (e.g. hub 22) defining an axis (axis A), a pulley (e.g. pulley 24) rotatably mounted to the hub, and a one-way clutch (e.g. clutch 32) and an isolation spring (e.g. spring 28) that act in series in a torque path between the pulley and the hub. Step 204 includes providing a damping member (e.g. damping member 64) configured to engage a friction surface on one of the pulley and the hub. Step 206 includes providing a damping member biasing member (e.g. biasing member 68) having a mounting portion (e.g. portion 70), a damping member engagement portion (e.g. portion 74) and a transition portion (e.g. portion 76) having at least one bend (two bends in the example embodiment shown in FIG. 3) between the mounting and damping member engagement portions. Step 208 includes mounting the damping member biasing member onto the other of the pulley and the hub such that the mounting portion of the damping member biasing member is engaged with an axially extending surface (e.g. surface 72) on said other of the pulley and the hub. The damping member engagement portion urges the damping member into engagement with the friction surface on said one of the pulley and the hub. Step 210 includes measuring, at least one time, a value related to a force between the damping member and the friction surface and adjusting a position of the damping member biasing member based on the value. Step 212 includes fixing the position of the damping member biasing member on the axially extending surface of said one of the pulley and the hub after step 210.

In other words, during assembly of the decoupler 20, the biasing member may be mounted and sensor may indicate a value related to the force applied by the biasing member on the damping member. By comparing this value to a target value, the assembly worker (or the assembly machine) may adjust the position of the damping member biasing member so as to bring the value closer to the target value. This may be a recursive process where the value is repeatedly measured so as to effectively continuously guide the adjustment of the position of the damping member biasing member. Alternatively, this measurement may take place one time only, and some corrective adjustment may be made based on a look up table, a formula or some other way. By providing this method and by providing a structure having the axially extending mounting surfaces 71 and 72, (i.e. by mounting to an axially extending surface, instead of mounting to a radially extending shoulder) adjustment of the position of the biasing member 68 can be made prior to its fixing to the hub 22 or pulley 24, so that the force applied by the biasing member 68 on the damping member, and therefore the force between the damping member 68 and the friction surface 60 (which is directly related to the damping force associated with the decoupler 20) can be controlled and made to more closely match a target force. By contrast, in some decouplers of the prior art the biasing member 68 mounts to a radial shoulder and so its position is simply based on the position of the shoulder. As a result, whatever tolerance stack up exists in any given example of that decoupler will affect the amount of flexure that is present in the biasing member, which can, in turn, affect the biasing force applied by the biasing member on the damping member and therefore the damping force. As a result, such prior art decouplers may need to compensate for this by being manufactured to relatively strict tolerances in order to ensure that the damping force (and the resulting damping torque, is not too low or too high, which can increase their cost.

While adjustment of the biasing member 68 as described above achieves a selected force, it will be noted that, in some embodiments, the biasing member 68 may be mounted to the hub or pulley and may be moved axially to reach a selected feature such as a radial shoulder. Such an embodiment is still beneficial for a variety of reasons, not the least of which is that the cost of manufacture of the decoupler 20 may be lower than that of some other decouplers that incorporate one or more Belleville washers and a thrust washer that mounts within a groove in the pulley. Also, it will be noted that the mounting portion 70 has a first, outboard axial end 70*a* and a second axially inboard axial end 70*b*, and that the first bend 78 of the transition portion 76 connects to the axially inboard end 70*b*. Furthermore, the second bend 80 is axially outboard relative to the first bend 78. The first and second bends 78 and 80 are configured such that the transition portion and the damping member engagement portion both extend generally transversely (i.e. generally horizontally in the view shown in FIG. 3, or, in other words, in a plane that is generally perpendicular to the axis A). With this configuration the axial height of the biasing member 68 is low.

As noted above, the first bend 78 is at the axially inboard end 70*b* of the mounting portion 70. If the first bend 78 has at least a selected radius, the first end can effectively act as a lead in region for the biasing member 68 that facilitates sliding of the biasing member 68 onto the mounting surface 72.

Those skilled in the art will understand that a variety of modifications may be effected to the embodiments described herein without departing from the scope of the appended claims.

The invention claimed is:

1. A decoupler, comprising:
   a hub defining an axis;
   a pulley that is rotatably mounted to the hub;
   a one way clutch and an isolation spring that act in series in a torque path between the pulley and the hub;
   a damping member that is positioned to frictionally engage a friction surface on one of the pulley and the hub; and
   a damping member biasing member positioned to urge the damping member into engagement with the friction surface, wherein the damping member biasing member has a mounting portion having an axially extending first mounting surface that is fixedly engaged with a second axially extending mounting surface on the other of the pulley and the hub and a damping member engagement portion that is resiliently connected to the mounting portion by a transition portion having at least one bend, wherein the at least one bend urges the damping member engagement portion into engagement with the damping member with a selected force, and wherein the at least one bend resiliently permits axial movement of the damping member engagement portion independent of the mounting portion.

2. A decoupler as claimed in claim 1, wherein the at least one bend includes a first bend and a second bend.

3. A decoupler as claimed in claim 2, wherein the first and second bends are configured such that the transition portion is generally S-shaped in profile.

4. A decoupler as claimed in claim 3, wherein the damping member biasing member has a first axial end and a second axial end that is axially inboard of the first axial end, wherein the first bend is at the second axial end, and has at least a selected bend radius to form a lead in region to facilitate mounting of the damping member biasing member on said axially extending mounting surface of said other of the pulley and the hub.

5. A decoupler as claimed in claim 4, wherein the second bend is axially outboard of the first bend.

6. A decoupler as claimed in claim 1, wherein the damping member engagement portion is engaged with the damping member sufficiently to prevent relative rotation therebetween during operation of the decoupler.

7. A decoupler as claimed in claim 1, wherein the damping member engagement portion lies substantially flat on an annular receiving surface of the damping member.

8. A decoupler as claimed in claim 7, wherein the friction surface is annular.

9. A decoupler as claimed in claim 8, wherein the damping member includes an axially extending lip that generally cooperates with the damping member engagement portion to keep the damping member generally centered about the axis.

10. A decoupler as claimed in claim 1, wherein the isolation spring is a helical torsion spring.

11. A decoupler as claimed in claim 1, wherein the one way clutch is a wrap spring clutch.

12. A decoupler, comprising:
a hub defining an axis;
a pulley that is rotatably mounted to the hub;
a one-way clutch and an isolation spring that act in series in a torque path between the pulley and the hub;
a damping member that is positioned to frictionally engage a friction surface on one of the pulley and the hub; and
a damping member biasing member positioned to urge the damping member into engagement with the friction surface, wherein the damping member biasing member has a radially outer portion fixedly engaged with a radially inner surface on the other of the pulley and the hub, wherein the damping member biasing member further includes a radially inner portion that is resiliently connected to the radially outer portion by a transition portion having a first bend and a second bend which are configured such that the transition portion is generally S-shaped in profile,
wherein the first and second bends cooperate to urge the radially inner portion into engagement with the damping member, and wherein the first and second bends cooperate to resiliently permit axial movement of the damping member engagement portion independent of the mounting portion.

13. A decoupler as claimed in claim 12, wherein the damping member biasing member has a first axial end and a second axial end that is axially inboard of the first axial end, wherein the first bend is at the second axial end, wherein the second bend is axially outboard of the first bend, and wherein the transition portion and the damping member engagement portion extend generally transversely.

14. A method of assembling a decoupler, comprising:
a) providing a hub defining an axis, a pulley rotatably mounted to the hub, and a one-way clutch and an isolation spring that act in series in a torque path between the pulley and the hub;
b) providing a damping member configured to engage a friction surface on one of the pulley and the hub;
c) providing a damping member biasing member having a mounting portion and a damping member engagement portion that is resiliently connected to the mounting portion by a transition portion having at least one bend;
d) mounting the damping member biasing member on the other of the pulley and the hub such that the mounting portion of the damping member biasing member is engaged with an axially extending surface of said other of the pulley and the hub, and such that the damping member engagement portion urges the damping member into engagement with the friction surface on said one of the pulley and the hub;
e) measuring, at least one time, a value related to a force between the damping member and the friction surface and adjusting the axial position of the damping member biasing member based on the value; and
f) fixing the position of the damping member biasing member on the axially extending surface of said one of the pulley and the hub after step e).

\* \* \* \* \*